United States Patent
Zhou et al.

(10) Patent No.: US 8,804,371 B2
(45) Date of Patent: *Aug. 12, 2014

(54) MOTHERBOARD ASSEMBLY HAVING SERIAL ADVANCED TECHNOLOGY ATTACHMENT DUAL IN-LINE MEMORY MODULE

(75) Inventors: Wu Zhou, Shenzhen (CN); Yang Liu, Shenzhen (CN); Cheng-Fei Weng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 272 days.

This patent is subject to a terminal disclaimer.

(21) Appl. No.: 13/299,075

(22) Filed: Nov. 17, 2011

(65) Prior Publication Data

US 2013/0114230 A1    May 9, 2013

(30) Foreign Application Priority Data

Nov. 7, 2011  (CN) .......................... 2011 1 0347924

(51) Int. Cl.
*H05K 1/11* (2006.01)
*H05K 1/14* (2006.01)

(52) U.S. Cl.
USPC ............................ 361/803; 361/784; 361/785

(58) Field of Classification Search
USPC ........................................ 361/803, 784, 785
See application file for complete search history.

(56) References Cited

U.S. PATENT DOCUMENTS 8,482,932 B2 * 7/2013 Tian et al. .................... 361/784

* cited by examiner

*Primary Examiner* — Andargie M Aychillhum
(74) *Attorney, Agent, or Firm* — Novak Druce Connolly Bove + Quigg LLP

(57) ABSTRACT

A motherboard assembly includes a serial advanced technology attachment dual-in-line memory module (SATA DIMM) with a circuit board, a memory slot, a platform controller hub (PCH), a storage device interface, and a storage controller connected to the PCH and the storage device interface. An edge connector is set on a bottom edge of the circuit board. A port is arranged on the circuit board, and connected to the storage chips and the storage device interface, enabling a motherboard to communicate with the SATA DIMM module.

3 Claims, 2 Drawing Sheets

MOTHERBOARD ASSEMBLY HAVING SERIAL ADVANCED TECHNOLOGY ATTACHMENT DUAL IN-LINE MEMORY MODULE

BACKGROUND

1. Technical Field

The present disclosure relates to a motherboard assembly having a serial advanced technology attachment dual in-line memory module (SATA DIMM).

2. Description of Related Art

Solid state drives (SSD) store data on chips instead of on magnetic or optical discs. One type of SSD has the form factor of a DIMM module and it is called a SATA DIMM module. The SATA DIMM module can be inserted into a memory slot of a motherboard, to add storage capacity. Generally, a SATA DIMM module includes a plurality of storage chips and a storage controller for controlling the storage chips to store data. The problem is that the life of the storage chips is usually shorter than that of the controller, and the module becomes useless once the storage chips no longer work.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
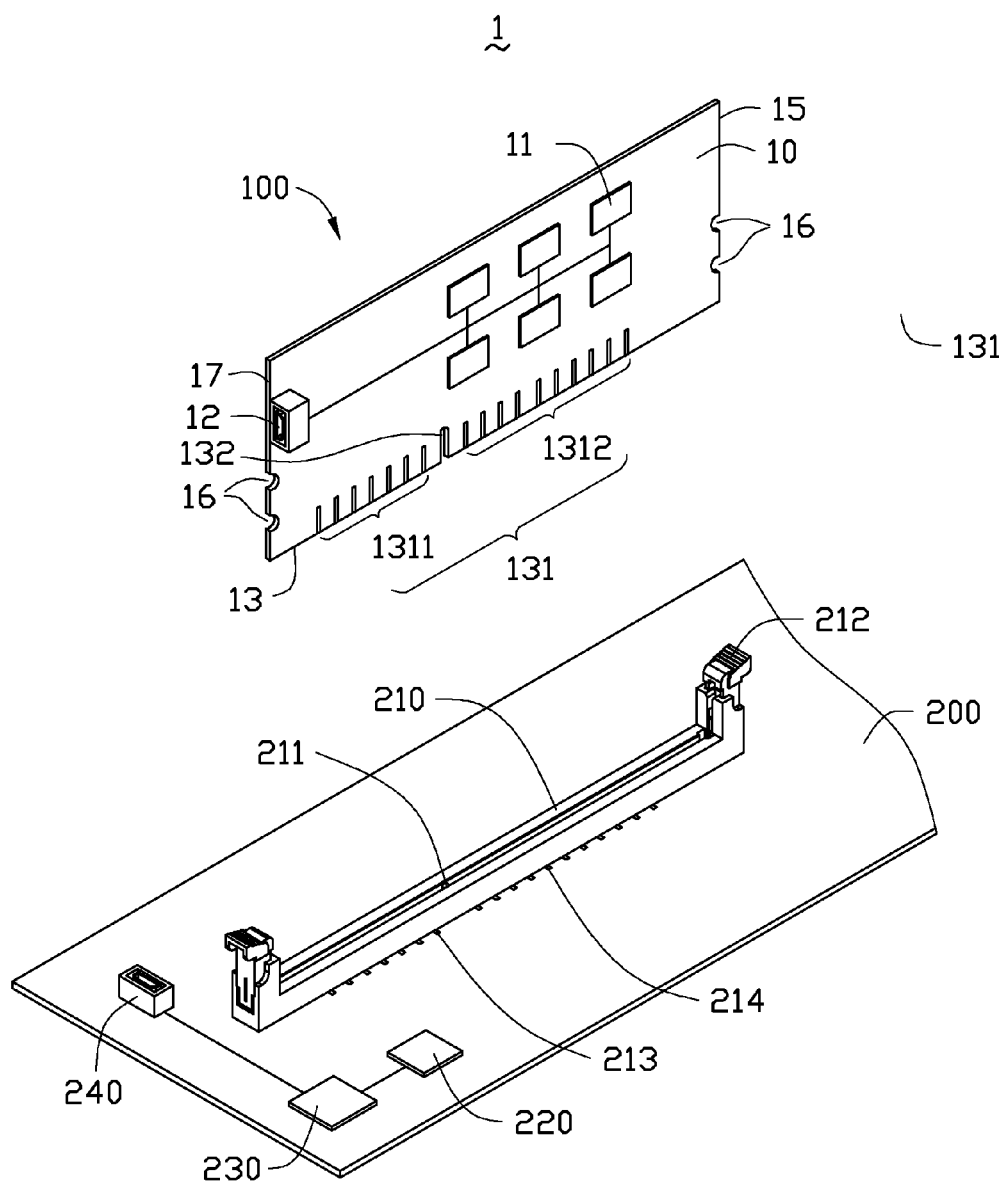
FIG. 1 is an exploded, isometric view of a motherboard assembly having a serial advanced technology attachment (SATA) dual in-line memory module (DIMM) in accordance with an exemplary embodiment of the present disclosure.
Figure 2:
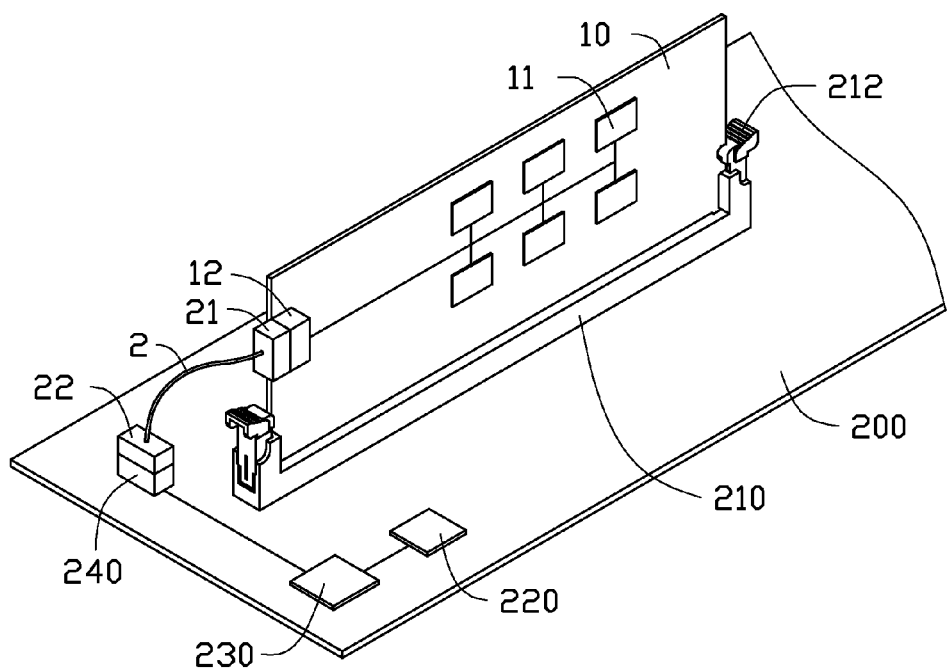
FIG. 2 is an assembled, isometric view of the motherboard assembly of FIG. 1.

Referring to FIGS. 1 and 2, a motherboard assembly 1 in accordance with an exemplary embodiment includes a serial advanced technology attachment dual-in-line memory module (SATA DIMM) module 100 and a motherboard 200. The module 100 includes a substantially rectangular circuit board 10. A plurality of storage chips 11 and a port 12 connected to the chips 11 are arranged on the board 10. An edge connector 131 is arranged on a bottom edge 13 of the circuit board 10 and a notch 132 is defined in the bottom edge 13. The edge connector 131 includes a plurality of power pins 1311 and a plurality of ground pins 1312. The power pins 1311 are connected to the chips 11. The ground pins 1312 are connected to a ground layer (not shown) of the board 10. Two grooves 16 are defined in two opposite ends 15 and 17 of the board 10. In one embodiment, the port 12 may be a SATA connector.

A memory slot 210, such as a double data rate type three (DDR3) or a double data rate type two (DDR2) memory slot, a platform controller hub (PCH) 220, a storage controller 230, and a storage device interface 240 are arranged on the motherboard 200. The storage controller 230 is connected to the PCH 220 and the storage device interface 240. The memory slot 210 includes a plurality of pins and a protrusion 211. The pins includes a plurality of power pins 213 corresponding to the power pins 1311 and a plurality of ground pins 214 corresponding to the ground pins 1312. The power pins 213 and the ground pins 214 are respectively connected to a power layer (not shown) and a ground layer (not shown) of the motherboard 200. Two fixing elements 212 are arranged at opposite ends of the memory slot 210.

In assembly, the edge connector 131 is inserted into the memory slot 210. The power pins 1311 are connected to the power pins 213, and the ground pins 1312 are connected to the ground pins 214. The protrusion 211 is engaged in the notch 132. The fixing elements 212 are engaged in the grooves 16, respectively. The port 12 is connected to the storage device interface 240 by two connectors 21 and 22 of a cable 2.

When the motherboard 200 receives power, the motherboard 200 outputs a voltage to the chips 11 through the power pins 213 and 1311. At the same time, the PCH 220 outputs a control signal, such as a SATA signal to the storage controller 230, to signal the storage controller 230 to control the storage chips 11 to store data, through the storage device interface 240, the cable 2, and the port 12.

The storage controller 230 is arranged on the motherboard 200, and remains useful even if the chips 11 need to be replaced.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A motherboard assembly, comprising:
a motherboard comprising:
  a platform controller hub (PCH);
  a storage device interface;
  a storage controller connected to the PCH and the storage device interface; and
  a memory slot comprising:
    a plurality of first power pins and a plurality of first ground pins; and
    a protrusion arranged in the memory slot; and
a serial advanced technology attachment dual-in-line memory module (SATA DIMM) comprising:
  a circuit board comprising:
    an edge connector set on a bottom edge of the circuit board engage in the memory slot, the edge connector comprising a plurality of second power pins connecting the first power pins and a plurality of second ground pins connecting the first ground pins;
  a notch defined in the edge connector;
  a plurality of storage chips arranged on the circuit board and connected to the plurality of second power pins of the edge connector; and
  a port arranged on the circuit board, and connected to the plurality of storage chips of the circuit board and the storage device interface of the motherboard; wherein the protrusion of the memory slot is engaged in the notch of the circuit board.

2. The motherboard assembly of claim 1, wherein the memory slot is a double data rate type three (DDR3) memory slot.

3. The motherboard assembly of claim 1, wherein the memory slot is a double data rate type two (DDR2) memory slot.

* * * * *